United States Patent
Dhuyvetter et al.

(10) Patent No.: US 8,134,403 B2
(45) Date of Patent: Mar. 13, 2012

(54) REDUCED CURRENT CHARGE PUMP

(75) Inventors: Timothy Alan Dhuyvetter, Arnold, CA (US); Brian Ben North, Santa Clara, CA (US); Cary L. Delano, Los Altos, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 12/644,697

(22) Filed: Dec. 22, 2009

(65) Prior Publication Data

US 2011/0148510 A1 Jun. 23, 2011

(51) Int. Cl.
G05F 1/10 (2006.01)
G05F 3/02 (2006.01)
(52) U.S. Cl. ............ 327/536; 327/537; 363/59; 363/60
(58) Field of Classification Search .................. 327/148, 327/157, 534–537; 363/59, 60
See application file for complete search history.

(56) References Cited

U.S. PATENT DOCUMENTS

| | | | |
|---|---|---|---|
| 7,253,676 B2 * | 8/2007 | Fukuda et al. ................ | 327/536 |
| 7,656,221 B2 * | 2/2010 | Maejima ....................... | 327/534 |
| 2008/0007980 A1 * | 1/2008 | Fujiwara ........................ | 363/59 |
| 2008/0304349 A1 * | 12/2008 | Suzuki et al. ................. | 365/226 |
| 2009/0066408 A1 * | 3/2009 | Fujiwara ....................... | 327/536 |
| 2009/0184697 A1 | 7/2009 | Park | |
| 2011/0018851 A1 * | 1/2011 | Huang et al. .................. | 345/211 |

* cited by examiner

Primary Examiner — Lincoln Donovan
Assistant Examiner — Brandon S Cole
(74) Attorney, Agent, or Firm — Schwegman, Lundberg & Woessner, P.A.

(57) ABSTRACT

This document discusses, among other things, a charge pump having a plurality of switching devices, coupled in parallel, and configured to selectively provide a variable available drive current for a capacitor using a comparison of an output voltage to at least one reference voltage.

20 Claims, 4 Drawing Sheets

REDUCED CURRENT CHARGE PUMP

BACKGROUND

Charge pumps are commonly used to convert an input voltage at a first level into an output voltage at a second level. Charge pumps can be capable of efficient operation and can be used to generate either a higher or a lower output voltage from an input voltage. In certain examples, a charge pump can include a capacitor, referred to herein as a "flying" capacitor, that can switch between multiple states in order to transfer charge from the input voltage to the output voltage. The orientation of the capacitor in each state, as well as the length of time the capacitor is coupled in each state, can control the amplitude of the output voltage.

OVERVIEW

This document discusses, among other things, a charge pump having a plurality of switching devices, coupled in parallel, and configured to selectively provide a variable available drive current for a capacitor (e.g., a flying capacitor) using a comparison of an output voltage to at least one reference voltage. The capacitor, in turn, can provide an output voltage for use by a load. In an example, a logic circuit can be configured to select at least one of the plurality of switching devices to provide the variable available drive current. A logic circuit can select the at least one of the plurality of switching devices using at least one feedback signal provided using a comparison of the output voltage to at least one reference voltage.

In Example 1, a charge pump includes a capacitor configured to be switched between at least two states, a plurality of switching devices coupled in parallel between an input voltage and the capacitor, the plurality of switching devices configured to selectively provide a variable available drive current to the capacitor, a first comparator configured to compare an output voltage of the capacitor to a first reference voltage and to provide a first feedback signal using the comparison, a second comparator configured to compare the output voltage of the capacitor to a second reference voltage and to provide a second feedback signal using the comparison, and a logic circuit configured to select at least one of the plurality of switching devices to provide the variable available drive current to the capacitor, wherein the logic circuit selects the at least one of the plurality of switching devices using the first and second feedback signals from the first and second comparators, wherein the variable available drive current is configured to vary depending on the selected at least one of the plurality of switching devices.

In Example 2, the plurality of switching devices of Example 1 optionally include a first switching device configured to provide a first available drive current and a second switching device configured to provide a second available drive current, wherein the first available drive current substantially corresponds to the second available drive current.

In Example 3, the logic circuit of any one or more of Examples 1-2 is optionally configured to increase the number of the selected at least one of the plurality of switching devices to increase the variable available drive current.

In Example 4, the logic circuit of any one or more of Examples 1-3 is optionally configured to decrease the number of the selected at least one of the plurality of switching devices to decrease the variable available drive current.

In Example 5, the plurality of switching devices of any one or more of Examples 1-4 optionally include a first switching device configured to provide a first available drive current and a second switching device configured to provide a second available drive current, wherein the first available drive current is optionally greater than the second available drive current.

In Example 6, the logic circuit of any one or more of Examples 1-5 is optionally configured to increase the available drive current by selecting the first switching device to provide the variable available drive current instead of the second switching device.

In Example 7, the first reference voltage and the second reference voltage of any one or more of Examples 1-6 optionally include bounds for the output voltage and the first reference voltage is higher than the second reference voltage, wherein the first comparator is optionally configured to provide a high signal when the output voltage is above the first reference voltage, and wherein the logic circuit is optionally configured to change the selected at least one of the plurality of switching devices to decrease the available drive current in response to the high signal.

In Example 8, the logic circuit of any one or more of Examples 1-7 is optionally configured to provide a plurality of control signals configured to select at least one of the plurality of switching devices using the first and second feedback signals.

In Example 9, the plurality of switching devices of any one or more of Examples 1-8 optionally include binary devices having an ON state and an OFF state, the binary devices configured to provide a discrete magnitude of available drive current in the ON state and an insignificant magnitude of available drive current in the OFF state.

In Example 10, the first comparator of any one or more of Examples 1-9 is optionally configured to provide a high signal when the output voltage is above the first reference voltage and to provide a low signal when the output voltage is below the second reference voltage, and wherein the second comparator of any one or more of Examples 1-9 is optionally configured to provide a high signal when the output voltage is below the second reference voltage and to provide a low signal when the output voltage is above the second reference voltage.

In Example 11, a method for providing an output voltage from a capacitor includes receiving an input voltage at a plurality of switching devices, providing a variable available drive current to a capacitor using at least one of the plurality of switching devices, providing the output voltage with the capacitor, comparing the output voltage of the capacitor at least one reference voltage, providing at least one feedback signal using the comparison, and selecting the at least one of the plurality of switching devices using the feedback signal using a logic circuit, wherein the variable available drive current varies depending on the selected at least one of the plurality of switching devices.

In Example 12, the comparing the output voltage to at least one reference voltage of any one or more of Examples 1-11 optionally includes comparing the output voltage to a first reference voltage and providing a first feedback signal using the comparison to the first reference voltage, and comparing the output voltage to a second reference voltage and providing a second feedback signal using the comparison to the second reference voltage, the second reference voltage optionally lower than the first reference voltage.

In Example 13, the selecting the at least one of the plurality of switching devices of any one or more of Examples 1-12 optionally includes increasing the available drive current when the output voltage is below the second reference voltage.

In Example 14, the providing the output voltage using the at least one of the plurality of switching devices of any one or more of Examples 1-13 optionally includes using a binary weighted current source, and wherein the increasing the available drive current includes increasing the number of switching devices used to provide the output voltage.

In Example 15, the selecting the plurality of switching devices of any one or more of Examples 1-4 optionally includes decreasing the available drive current when the output voltage is above the first reference voltage.

In Example 16, the providing the feedback signal of any one or more of Examples 1-15 optionally includes providing a high signal from a comparator when the output voltage is above the at least one threshold and providing a low signal from a comparator when the output voltage is below the at least one threshold.

In Example 17, a circuit for providing an output voltage includes a flying capacitor configured to be coupled between at least two states, wherein the flying capacitor is configured to provide the output voltage from an input voltage, a binary weighted current source including a plurality of switching devices coupled in parallel between the input voltage and the flying capacitor, the plurality of switching devices configured to provide charge from the input voltage to the flying capacitor, wherein at least one of the plurality of switching devices is configurable into an ON state and OFF state such that differing current is available to be provided to the flying capacitor depending on whether the at least one switching device is in the ON state or OFF state, a first comparator configured to compare the output voltage to a first reference voltage and provide a first feedback signal using the output voltage, wherein the first reference voltage includes a desired output voltage, a second comparator configured to compare the output voltage to a second reference voltage and provide a second feedback signal using the output voltage, wherein the second reference voltage includes a high output voltage threshold, a third comparator configured to compare the output voltage to a third reference voltage and provide a third feedback signal using the output voltage, wherein the third reference voltage includes a low output voltage threshold, and a logic circuit configured to select at least one of the plurality of switching devices to provide the input voltage to the flying capacitor using the feedback signal from the first, second, and third comparators.

In Example 18, the logic circuit of any one or more of Examples 1-17 is optionally configured to hold the selected at least one of the plurality of switching devices to provide the available drive current when the first feedback signal indicates that the output voltage is near the desired output voltage.

In Example 19, the logic circuit of any one or more of Examples 1-18 is optionally configured to increase the number of the selected at least one of the plurality of switching devices to increase the available drive current when the second feedback signal indicates that the output voltage is above the high output voltage threshold.

In Example 20, the logic circuit of any one or more of Examples 1-19 is optionally configured to decrease the number of the selected at least one of the plurality of switching devices to decrease the available drive current when the second feedback signal indicates that the output voltage is below the low output voltage threshold.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In conventional charge pump circuits, drive current is provided to a flying capacitor with a single switching device. The single switching device, therefore, must be sized large enough to provide sufficient drive current during maximum load conditions. The present inventors have recognized, among other things, that the use of single switching device results in high efficiency during maximum load conditions, but lower efficiency during light load conditions. The lower efficiency during the light load conditions can be primarily due to the gate charge energy losses consumed by the large switching device.

The present inventors have developed circuits and methods having high efficiency during both heavy and light load conditions. In certain examples, the circuits and methods include a plurality of switching devices to provide the drive current to the flying capacitor. Each of the plurality of switching devices can be configured as a discrete current source to supply drive current to the flying capacitor. Each of the plurality of switching devices can be configured to be set in an ON or an OFF state using the load conditions. In an example, the magnitude of drive current provided to support the output voltage can be adjustable, and the effective size of the switching device used to provide the drive current can be dynamically adjusted using the drive current requirements.

Figure 1:
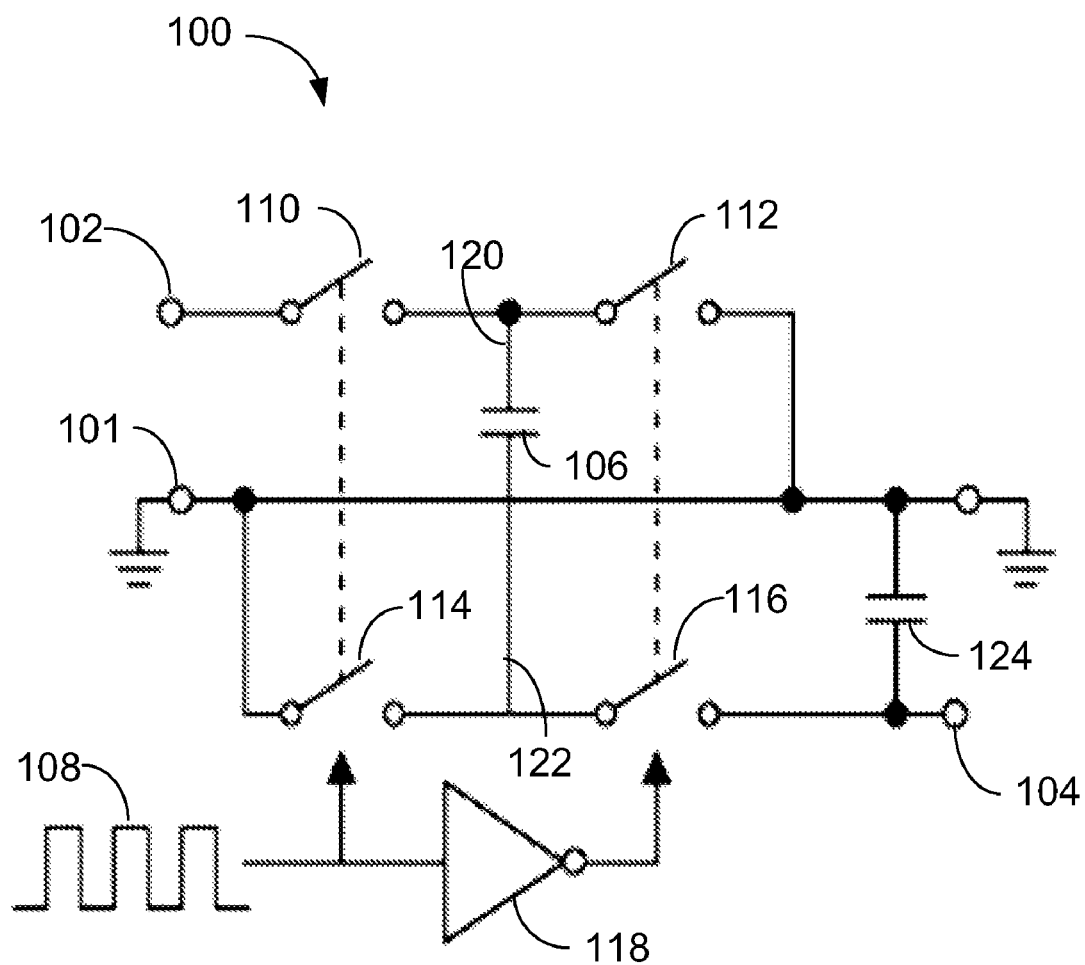
FIG. 1 illustrates generally an example of a charge pump circuit.

FIG. 1 illustrates generally an example of a charge pump 100 for converting an input voltage 102 into an output voltage 104. The charge pump 100 can include a flying capacitor 106 that can be coupled between a plurality of states in order to transfer charge from the input voltage 102 to the output voltage 104. In an example, the flying capacitor 106 can be coupled between two states, however, in other examples the flying capacitor 106 can be coupled between more than two states.

A control signal 108 can set the flying capacitor 106 in either the first state of the second state. The control signal 108 can set each of a first switching device 110, a second switching device 112, a third switching device 114, and a fourth switching device 116 open or closed to set the state of flying capacitor 106. In an example, the control signal 108 can cycle high and low to rapidly switch the flying capacitor 106 between a first and second state.

In an example, when the control signal 108 is above a reference voltage, the flying capacitor 106 can be set in the first state. In the first state, the first switching device 110 and the third switching device 114 can be set in the closed position. The inverter 118 can invert the control signal 108 and provide a low signal to set both the second switching device 112 and the fourth switching device 116 in the open position. In the first state, therefore, the flying capacitor 106 can be coupled on a first side 120 to the input voltage 102 and on a second side 122 to ground 101. In the first state, the flying capacitor 106 can receive a positive charge from the input voltage 102.

When the control signal 108 falls below a reference voltage, the flying capacitor 106 can be set in the second state. In the second state, the first switching device 110 and the third switching device 114 can be set open. Additionally, the second switching device 112 and the fourth switching device 114 can be set closed in the second state. Setting the second switching device 112 and the fourth switching device 114 closed can couple the first side 120 of the flying capacitor 106 to ground 101 and the second side 122 to the output voltage 104. Accordingly, the first side 120 of the flying capacitor 106 that has a stored positive charge can be coupled to ground 101 in the second state. The first side 120 of the flying capacitor 106 can acquire the positive charge from the input voltage while the flying capacitor 106 is in the first state. Coupling the first side 120 to ground 101 in the second state can result in a negative voltage at the output voltage 104. A reservoir capacitor 124 can store charge from the flying capacitor 106 to smooth the output voltage 104.

Although in the example shown in FIG. 1, the charge pump 100 can be configured to convert an input voltage 102 into a negative output voltage 104, in other examples the charge pump 100 can be configured to convert the input voltage 102 into an output voltage 104 of the same sign (e.g. either higher or lower than the input voltage).

As shown in FIG. 1, when the first switching device 110 is closed, charge can be transferred from the input voltage 102 to the flying capacitor 106. Using a single switching device to transfer charge, such as switching device 101, however, can result in inefficient operation during light load conditions.

Figure 2:
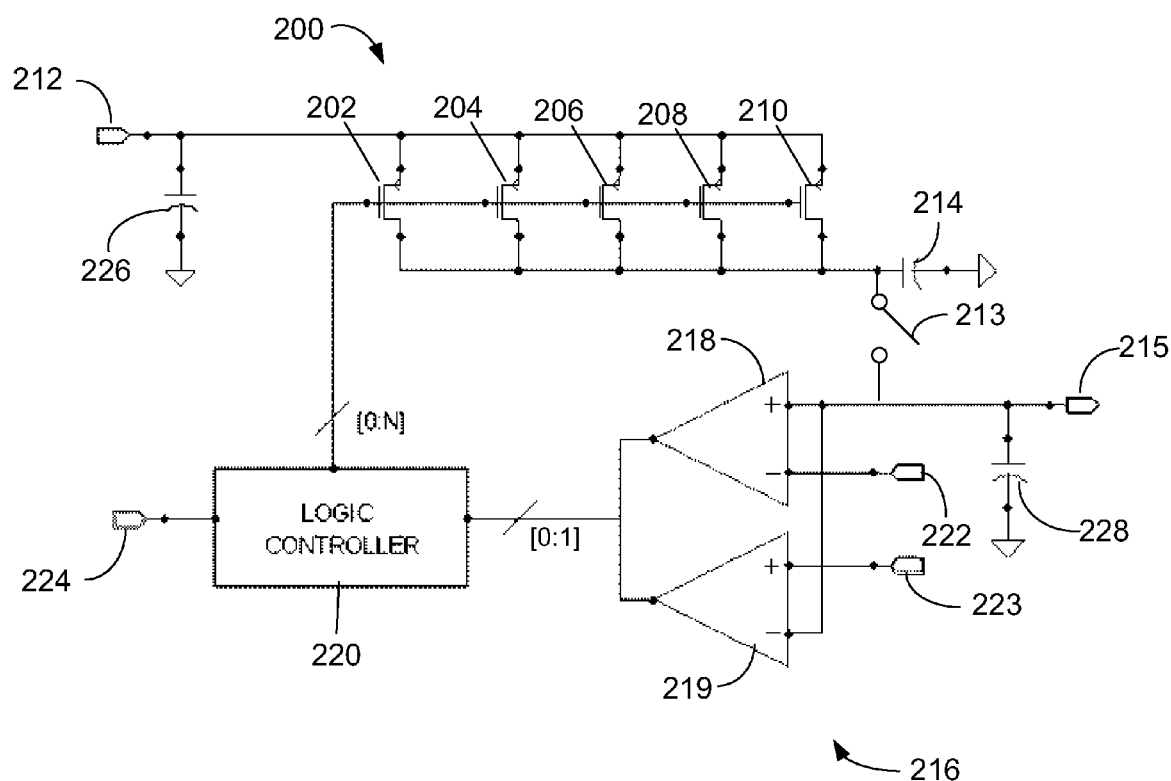
FIG. 2 illustrates generally an example of a circuit for dynamically adjusting the effective size of a switching device in a charge pump.

FIG. 2 illustrates generally an example of a circuit 200 configured to provide efficient operation during both light and heavy load conditions. The circuit 200 of FIG. 2 can provide efficient operation during both light and heavy load conditions by including a plurality of switching devices 201 that are configured to selectively transfer charge from an input voltage 212 to a flying capacitor 214. In certain examples, the plurality of switching devices 201 can include two switching devices, or more than two switching devices (e.g. a first switching device 202, a second switching device 204, a third switching device 206, a fourth switching device 208, and a fifth switching device 210) configured to provide a variable available drive current to the flying capacitor 214. The plurality of switching devices 201 can be coupled in parallel between the input voltage 212 and the flying capacitor 214. In an example, the plurality of switching devices 201 can be used in the circuit 100 of FIG. 1 instead of the first switching device 110. In operation, the circuit 200 of FIG. 2 can be configured to provide power to a load (not shown) that is coupled to an output voltage 215 from the flying capacitor 214.

In an example, each of the switching devices 201 can be configured to be individually controlled such that any one or more of the switching devices 201 can be used to transfer charge from the input voltage 212 to the flying capacitor 214 at a given time. Individually controlling each of the switching devices 201 can enable the effective size of the plurality of switching devices 201 used to transfer charge from the input voltage 212 to the flying capacitor 214 to be dynamically adjusted. In an example, controlling the effective size of the plurality of switching devices 201 can control the potential amount of drive current provided by the plurality of switching devices 201. When the effective size of the switching devices 201 is large, the potential current can also be large, and when the effective size is small, the potential current can also be small.

The plurality of switching devices 201 can also be viewed as discrete current sources for the flying capacitor 214. In these terms, the plurality of switching devices 201 are controlled in order to control the amount of drive current provided by the plurality of switching devices 201. In an example, each of the switching devices 201 include binary devices having two states, an ON state and an OFF state. In an example, one of the plurality of switching devices 201 in the ON state can provide a discrete amount drive current to the flying capacitor 214, and in the OFF state can provide a minimal amount of drive current to the flying capacitor 214.

The circuit 200 of FIG. 2 can operate in two distinct states. The first state can include where charge from the input voltage 212 can be transferred to the flying capacitor 214. The second state can include where charge from the flying capacitor 214 can be transferred to the output voltage 215. In operation, a load (not shown) can be coupled to the output voltage 215, and the circuit 200 of FIG. 2 can be configured to provide power to the load via the output voltage 215. The plurality of switching devices 201 can provide current to the flying capacitor when the circuit 200 of FIG. 2 is set in the first state, and do not provide current (or only minimal current) to the flying capacitor 214 when the circuit 200 is in the second state. Accordingly, a switching device 201 in the ON state can provide current to the flying capacitor 214 when the circuit 200 is in the first state, and in certain examples, does not provide current (or only minimal current) to the flying capacitor 214 when the circuit 200 is in the second state. In an example, a switching device 201 in the ON state can switch on and off as the state of the circuit 200 of FIG. 2 changes. Conversely, a switching device 201 in the OFF state, in certain examples, does not provide current (or only minimal current) to the flying capacitor 214 in either the first or second state. Likewise, a switching device 201 in the OFF state, in certain examples, does not switch on and off as the state of circuit 200 changes. A switching device 210 in the OFF state can remain off as the state of circuit 200 of FIG. 2 changes.

In an example, the plurality of switching devices 201 can be configured as a binary weighted current source. As a binary weighted current source, each of the switching devices 201 when in the ON state can provide corresponding magnitudes of drive current to the flying capacitor 214. In certain examples, each of the switching devices 201 include high side P-channel metal-oxide-semiconductor field-effect transistors (MOSFET) having an output resistance of 2 kOhms. Moreover, in certain examples, each P-MOS switching device can be set in the ON state by providing sufficient voltage to the gate of the P-MOS switching device such that the P-MOS switching device operates in saturation. Likewise, each P-MOS switching device can be set in the OFF state by providing sufficiently low voltage to the gate of the P-MOS switching device such that the P-MOS switching device provides an insignificant amount of drive current to the flying capacitor 214.

Figure 3:
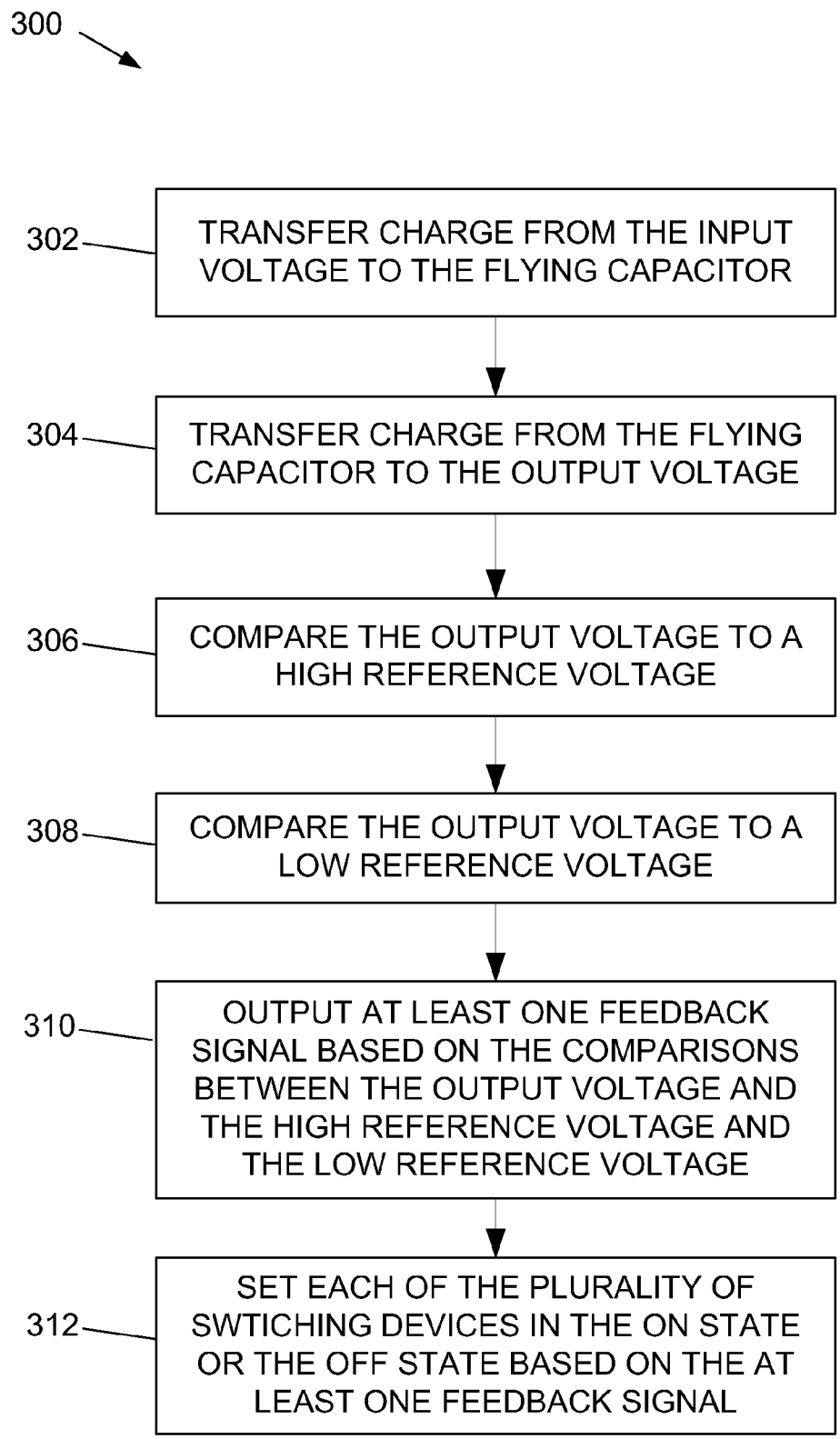
FIG. 3 illustrates generally an example of a method of dynamically adjusting the effective size of a switching device in a charge pump.

FIG. 3 illustrates generally an example of a method 300 of dynamically adjusting the effective size of a switching device in a charge pump. The method 300 adjusts the magnitude of drive current provided by the switching devices using the load conditions. The method 300 of FIG. 3 is explained with reference to circuit 200 of FIG. 2, however, in other examples other circuits can be used.

At 302, the circuit 200 of FIG. 2 can be set in a first state configured to transfer charge from the input voltage 212 to a flying capacitor 214. After a period of time in the first state, at 304, the circuit 200 of FIG. 2 can be set to a second state configured to transfer charge from the flying capacitor 214 to the output voltage 215.

As mentioned above, the flying capacitor 214 can be configured to be switched between two states. In the first state, an output switching device 213 can be open and at least one of the plurality of switching devices 201 can be closed such that the flying capacitor 214 can receive charge from the input voltage 212. In the second state, the output switching device 213 can be set closed and all of the plurality of switching devices 201 can be set open. Thus, in the second state, the charge stored in the flying capacitor 214 can be transferred to the output voltage 215 and a reservoir capacitor 228.

The circuit 200 of FIG. 2 can sense the level of the output voltage 215 to ascertain indicia of the load conditions and can adjust the switching devices 201 using the output voltage 215. To sense the output voltage 215 and adjust the plurality of switching devices 201, the circuit 200 of FIG. 2 can include a feedback loop 216. The feedback loop 216 can include a first comparator 218, a second comparator 219, and a controller 220. The controller 220 can include digital circuitry. In an example, the circuit 200 of FIG. 2 can also include a clock 224 to provide a clock signal controller 220.

At 306, the first comparator 218 can receive the output voltage 215 and can compare the output voltage 215 to a high reference voltage 222. At 308, the second comparator 219 can compare the output voltage 215 to a low reference voltage 223. Using the comparisons, at 310, the first and second comparators 218, 219 can provide a feedback signal to the controller 120. In an example, the feedback loop 216 can maintain the output voltage 215 between the high reference voltage 222 and the low reference voltage 223. In an example, the high reference voltage 222 and the low reference voltage 223 can include bounds for the output voltage 215.

When the output voltage 215 rises above the high reference voltage 222, the first comparator 218 can output a feedback signal indicating that the output voltage 215 is above the high reference voltage 222. Likewise, when the output voltage 215 falls below the high reference voltage 222, the first comparator 218 can output a feedback signal indicating that the output voltage 215 is below the high reference voltage 222. In an example, the first comparator 218 can output a digital signal including either a high (e.g. digital "1") or a low (e.g. digital "0") signal to the controller 220. In an example, the first comparator 218 can output a high signal when the output voltage 215 is higher than the high reference voltage 222 and a low signal when the output voltage 215 is lower than the high reference voltage 222.

Similarly, when the output voltage 114 falls below the low reference voltage 223, the second comparator 219 can output a feedback signal indicating that the output voltage 215 is below the low reference voltage 223. When the output voltage 215 rises above the low reference voltage 223, the second comparator 219 can output a feedback signal indicating that the output voltage 215 is below the low reference voltage 223. In an example, the second comparator 219 can output a digital signal including either a high (e.g. digital "1") or a low (e.g. digital "0") signal to the controller 220. In an example, the second comparator 219 can output a high signal when the output voltage 215 is lower than the low reference voltage 223, and can output a low signal when the output voltage 215 is above the low reference voltage 223.

At 312, the controller 220 can receive the feedback signals from the first and second comparators 218, 219. Also at 312, the controller 220 can select which of the plurality of switching devices 201 are used to transfer charge from the input voltage 212 to the flying capacitor 214 using the outputs from the first and second comparator 218, 219. In one example, the controller 220 can select a switching device 201 (e.g. the first switching device 201) by setting the first switching device 201 in the ON state.

The controller 220 can enable a fast response time in adjustment of the plurality of switching device 201 in response to the output voltage 215. To provide the fast response time, the controller 220 can include a digital logic circuit that changes state using the outputs from the first and second comparator 218, 219. The digital logic of the controller 220 can operate using a clock signal from clock 224. In an example, at east transition of clock signal from high to low the controller 220 can receive the outputs from the first and second comparators 218, 219. Based on whether each of the feedback signals is high or low, the controller 220 can output at least one signal to control the plurality of switching devices 201. Accordingly, the speed at which the plurality of switching devices 201 is adjusted using the output voltage 215 is using the frequency of clock 124. A higher frequency clock 124 can result in more frequently receiving of the digital feedback signals by the controller 220 and more frequency adjustment of the plurality of switching devices 201.

When the controller 220 receives an output from the first comparator 218 that indicates that the output voltage 215 is above the high reference voltage 222, the controller 222 can reduce the drive current in order to reduce the output voltage 215. Likewise, when the controller 220 receives an output from the second comparator 219 that indicates that the output voltage 215 is below the low reference voltage 223, the controller 220 can increase the drive current to increase the output voltage 215. The controller 220 can increase and decreases the drive current by controlling which of the plurality of switching devices 201 are used to transfer charge from the input voltage 212 to the flying capacitor 214.

In an example, when the plurality of switching devices 201 are configured as a binary weighted current source, the drive current can be increased by increasing the number of switching devices 201 used to transfer charge to the flying capacitor 214. Likewise, to decrease the drive current supplied to the flying capacitor 214, the number of switching devices 201 used can be decreased.

FIG. 3 illustrates generally an example of a method 300 of operation of the controller 220 when the plurality of switching devices 201 operate as a binary weighted current source. In an example, each of the switching devices 201 is capable of providing 1 mA of drive current to the flying capacitor 214 when in the ON state. At 302, the first switching device 202 is set in the ON state and second, third, fourth, and fifth switching devices 204, 206, 208, 210 are set in the OFF state. At 304 and 306, the first and second comparators 218, 219 sense the output voltage 215. At 308, the first and second comparators 218, 219 provide feedback signals using the comparisons between the output voltage 215 and the high and low reference voltages 222, 223. As the load current draw increases, the output voltage 215 can be pulled down. When the output voltage 215 drops below the low reference voltage 223, the second comparator 219 can provide a high signal to the controller 220. At 312 (e.g. on the next clock cycle), the controller 220 can receive the high output from the second comparator 219 and can increase the number of switching devices 201 used to transfer charge to the flying capacitor 214. In an example, when the output voltage 215 drops below the low reference voltage 223, the controller 220 can set the second switching device 204 from the OFF state to the ON state. Accordingly, an additional 1 mA of drive current can be provided to the flying capacitor 214.

When the load current draw decreases, the excess drive current can cause the output voltage 215 to increase. When the output voltage 215 rises above the high reference voltage 222, the first comparator 218 can provide a high feedback signal to the controller 220. In response to the high feedback signal, the controller 220 can decrease the number of switching devices 201 used to provide the drive current. Thus, in an example, the controller 220 can switch the second switching device 204 from the ON state to the OFF state to reduce the drive current by 1 mA such that the first switching device 202 is in the ON state and the second, third, fourth, and fifth switching devices 204, 206, 208, 210 are in the OFF state.

In this manner, the controller 220 and the plurality of switching devices 201 can control the drive current to maintain the output voltage 214 at a substantially constant level with a varying load current draw. Additionally, the controller 220 can adjust the effective switching size of the plurality of switching devices 201 such that when the plurality of switching devices 201 switch open and closed as the state of flying capacitor 214 changes, an amount of energy proportional to the amount of drive current can be used to switch the switching devices 201 open and closed.

In an example, the circuit 200 of FIG. 2 can include distinct signal paths between each of the first and second comparators 218, 219 and the controller 220, such that the controller 220 can receive a distinct output from each of the first and second comparators 218, 219. In certain examples, the circuit 200 of FIG. 2 can include distinct signal paths between the controller 220 and each of the plurality of switching devices 201. In an example, the controller 220 can control the state (ON or OFF) of each switching device 201 with a digital (e.g. high or low) signal. In this manner, the controller 220 can individually set each switching device in the ON state or the OFF state.

In an example, the plurality of switching devices 201 can include a mixture of switching devices providing differing amounts of drive current. For example, a first switching device 202 can be configured to provide a large current, while a second switching device 204 can be configured to provide a small current. In order to configure the circuit 200 of FIG. 2 for a large current, the controller 220 can set the first switching device 202 in the ON state and the second switching device 204 in the OFF state. Likewise, to configure the circuit 200 of FIG. 2 for a small current, the controller 220 can set the first switching device 202 in the OFF state and the second switching device 204 in the ON state. As is evident, a combination of switching devices having similar and different drive current capabilities can be used.

In an example, regardless of the size of each switching device used in the plurality of switching devices 201, the controller 220 can control which of the switching devices 201 are used in order to hold the output voltage 215 substantially constant for use as a regulated DC power source. The circuit 200 of FIG. 2 can also include an input capacitor 226 to stabilize the input voltage 212.

Although in the examples provided above, five switching devices are used, in other examples more or less than five switching devices can be used. Increasing the number of switching devices can increase the granularity of the drive current and effective switch size provided by the plurality of switching devices.

Figure 4:
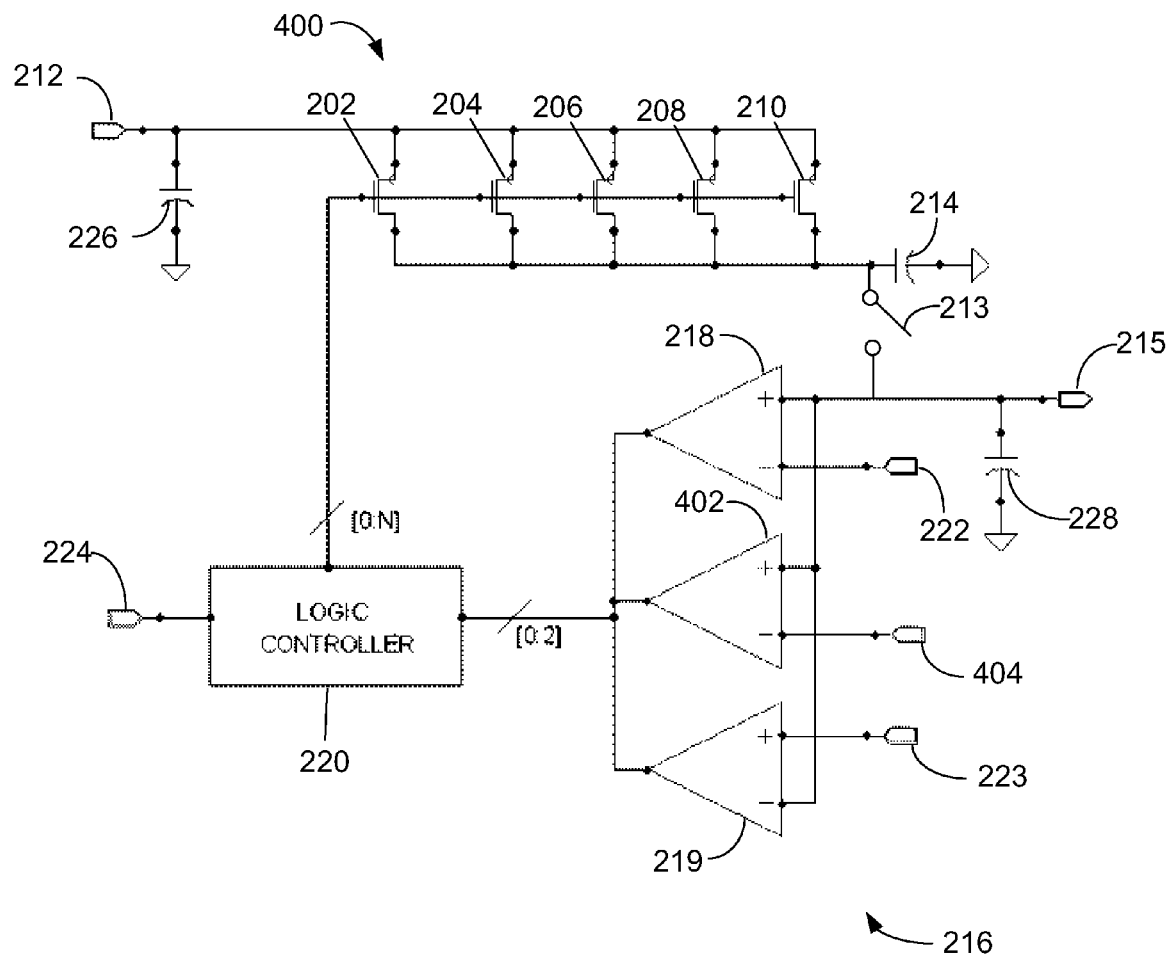
FIG. 4 illustrates generally an example of a circuit for dynamically adjusting the effective size of a switching device in a charge pump.

FIG. 4 illustrates generally an example of a circuit 400 for providing efficient operation during both light and heavy load conditions. The circuit 400 of FIG. 4 can include many components corresponding to components described in circuit 200. As a result, some of the same reference numerals used in circuit 200 are used in circuit 400.

The circuit 400 of FIG. 4 can include a plurality of switching devices 201, a first comparator 218, a second comparator 219, a controller 220, and a clock 224. Each of these components performs similarly to those described with respect to circuit 200. The circuit 400 of FIG. 4, however, can also include a third comparator 402. The third comparator 402 can sense the output voltage 215 and compare the output voltage 215 to a mid reference voltage 404. In one example, the mid reference voltage 304 can include a desired voltage for output voltage 215. In one example, the third comparator 402 can output a high signal when the output voltage 215 is above the mid reference voltage 404 and a low signal when the output voltage 215 is below the mid reference voltage 404. By receiving the output from the third comparator 402, the controller 220 can estimate when the output voltage 215 is near the mid reference voltage 404. In an example, the controller 220 can estimate when the output voltage 215 is near the mid reference voltage 404 based on whether the third comparator 402 switches between a high and a low output signal. When the controller 220 determines that the output voltage 215 is near the mid reference voltage 404, the controller 220 can maintain the current settings of the plurality of switching devices 201. In this way, the third comparator 402 aids in reducing output ripple and noise in the output voltage 215.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A charge pump comprising:
a flying capacitor configured to be switched between at least two states, wherein the flying capacitor is configured to provide the output voltage from an input voltage;
a plurality of switching devices coupled in parallel between the input voltage and the flying capacitor, the plurality of switching devices configured to selectively provide a variable available drive current to the flying capacitor;
a first comparator configured to compare the output voltage to a first reference voltage and to provide a first feedback signal using the comparison;
a second comparator configured to compare the output voltage to a second reference voltage and to provide a second feedback signal using the comparison;
a logic circuit configured to select at least one of the plurality of switching devices to provide the variable available drive current to the flying capacitor, wherein the logic circuit selects the at least one of the plurality of switching devices using the first and second feedback signals from the first and second comparators, wherein the variable available drive current is configured to vary depending on the selected at least one of the plurality of switching devices; and
wherein the plurality of switching devices include binary devices having an ON state and an OFF state, the binary devices configured to provide a discrete magnitude of available drive current in the ON state and an insignificant magnitude of available drive current in the OFF state.

2. The charge pump of claim 1, wherein the plurality of switching devices include a first switching device configured to provide a first available drive current and a second switching device configured to provide a second available drive current, wherein the first available drive current substantially corresponds to the second available drive current.

3. The charge pump of claim 2, wherein the logic circuit is configured to increase the number of the selected at least one of the plurality of switching devices to increase the variable available drive current.

4. The charge pump of claim 2, wherein the logic circuit is configured to decrease the number of the selected at least one of the plurality of switching devices to decrease the variable available drive current.

5. The charge pump of claim 1, wherein the plurality of switching devices include a first switching device configured to provide a first available drive current and a second switching device configured to provide a second available drive current, wherein the first available drive current is greater than the second available drive current.

6. The charge pump of claim 5, wherein the logic circuit is configured to increase the available drive current by selecting the first switching device to provide the variable available drive current instead of the second switching device.

7. The charge pump of claim 1, wherein the first reference voltage and the second reference voltage include bounds for the output voltage and the first reference voltage is higher than the second reference voltage;
wherein the first comparator is configured to provide a high signal when the output voltage is above the first reference voltage; and
wherein the logic circuit is configured to change the selected at least one of the plurality of switching devices to decrease the available drive current in response to the high signal.

8. The charge pump of claim 1, wherein the logic circuit is configured to provide a plurality of control signals configured to select at least one of the plurality of switching devices using the first and second feedback signals.

9. The charge pump of claim 1, wherein the first comparator is configured to provide a high signal when the output voltage is above the first reference voltage and to provide a low signal when the output voltage is below the second reference voltage; and
wherein the second comparator is configured to provide a high signal when the output voltage is below the second reference voltage and to provide a low signal when the output voltage is above the second reference voltage.

10. A method for providing an output voltage from a flying capacitor, the method comprising:
receiving an input voltage at a plurality of switching devices;
providing a variable available drive current to the flying capacitor using at least one of the plurality of switching devices;
providing the output voltage with the flying capacitor;
comparing the output voltage with at least one reference voltage;
providing at least one feedback signal using the comparison; and
selecting the at least one of the plurality of switching devices using the feedback signal, wherein the variable available drive current varies depending on the selected at least one of the plurality of switching devices;

wherein the selecting the at least one of the plurality of switching devices includes increasing the available drive current when the output voltage is below the second reference voltage; and wherein the providing the output voltage using the at least one of the plurality of switching devices includes using a binary weighted current source, and wherein the increasing the available drive current includes increasing the number of switching devices used to provide the output voltage.

11. The method of claim 10, wherein the comparing the output voltage to at least one reference voltage includes:

comparing the output voltage to a first reference voltage and providing a first feedback signal using the comparison to the first reference voltage; and comparing the output voltage to a second reference voltage and providing a second feedback signal using the comparison to the second reference voltage, the second reference voltage lower than the first reference voltage.

12. The method of claim 10, wherein the selecting the plurality of switching devices includes decreasing the available drive current when the output voltage is above the first reference voltage.

13. The method of claim 10, wherein the providing the feedback signal includes providing a high signal from a comparator when the output voltage is above the at least one threshold and providing a low signal from a comparator when the output voltage is below the at least one threshold.

14. A circuit for providing an output voltage, the circuit comprising:

a flying capacitor configured to be coupled between at least two states, wherein the flying capacitor is configured to provide the output voltage from an input voltage;

a binary weighted current source including a plurality of switching devices coupled in parallel between the input voltage and the flying capacitor, the plurality of switching devices configured to provide charge from the input voltage to the flying capacitor, wherein at least one of the plurality of switching devices is configurable into an ON state and OFF state such that differing current is available to be provided to the flying capacitor depending on whether the at least one switching device is in the ON state or OFF state;

a first comparator configured to compare the output voltage to a first reference voltage and provide a first feedback signal using the output voltage, wherein the first reference voltage includes a desired output voltage;

a second comparator configured to compare the output voltage to a second reference voltage and provide a second feedback signal using the output voltage, wherein the second reference voltage includes a high output voltage threshold;

a third comparator configured to compare the output voltage to a third reference voltage and provide a third feedback signal using the output voltage, wherein the third reference voltage includes a low output voltage threshold; and a logic circuit configured to select at least one of the plurality of switching devices to provide the input voltage to the flying capacitor using the feedback signal from the first, second, and third comparators.

15. The circuit of claim 14, wherein the logic circuit is configured to hold the selected at least one of the plurality of switching devices to provide the available drive current when the first feedback signal indicates that the output voltage is near the desired output voltage.

16. The circuit of claim 14, wherein the logic circuit is configured to increase the number of the selected at least one of the plurality of switching devices to increase the available drive current when the second feedback signal indicates that the output voltage is above the high output voltage threshold.

17. The circuit of claim 14, wherein the logic circuit is configured to decrease the number of the selected at least one of the plurality of switching devices to decrease the available drive current when the second feedback signal indicates that the output voltage is below the low output voltage threshold.

18. A charge pump comprising:

a flying capacitor configured to be switched between at least two states, wherein the flying capacitor is configured to provide the output voltage from an input voltage;

a plurality of switching devices coupled in parallel between the input voltage and the flying capacitor, the plurality of switching devices configured to selectively provide a variable available drive current to the flying capacitor;

a first comparator configured to compare the output voltage to a first reference voltage and to provide a first feedback signal using the comparison;

a second comparator configured to compare the output voltage to a second reference voltage and to provide a second feedback signal using the comparison;

a logic circuit configured to select at least one of the plurality of switching devices to provide the variable available drive current to the flying capacitor, wherein the logic circuit selects the at least one of the plurality of switching devices using the first and second feedback signals from the first and second comparators, wherein the variable available drive current is configured to vary depending on the selected at least one of the plurality of switching devices;

wherein the first reference voltage and the second reference voltage include bounds for the output voltage and the first reference voltage is higher than the second reference voltage;

wherein the first comparator is configured to provide a high signal when the output voltage is above the first reference voltage; and wherein the logic circuit is configured to change the selected at least one of the plurality of switching devices to decrease the available drive current in response to the high signal.

19. The charge pump of claim 18, wherein the plurality of switching devices include a first switching device configured to provide a first available drive current and a second switching device configured to provide a second available drive current, wherein the first available drive current substantially corresponds to the second available drive current.

20. The charge pump of claim 18, wherein the plurality of switching devices include a first switching device configured to provide a first available drive current and a second switching device configured to provide a second available drive current, wherein the first available drive current is greater than the second available drive current.

* * * * *